(12) United States Patent
Berry (10) Patent No.: US 7,926,474 B2
(45) Date of Patent: Apr. 19, 2011

(54) UNDERWATER CATAPULT IN WHICH THE ARROW IS PROPELLED ALONG THE LENGTH OF THE BARREL

(76) Inventor: Marc-Antoine Berry, Douzains-par-Castillonnes (FR)

( * ) Notice: Subject to any disclaimer, the term of this patent is extended or adjusted under 35 U.S.C. 154(b) by 954 days.

(21) Appl. No.: 10/563,623

(22) PCT Filed: Jul. 5, 2004

(86) PCT No.: PCT/FR2004/001732
§ 371 (c)(1),
(2), (4) Date: May 30, 2006

(87) PCT Pub. No.: WO2005/004594
PCT Pub. Date: Jan. 20, 2005

(65) Prior Publication Data
US 2006/0243262 A1    Nov. 2, 2006

(30) Foreign Application Priority Data

Jul. 8, 2003   (FR) ..................................... 03 08304

(51) Int. Cl.
*F41B 7/04*   (2006.01)
(52) U.S. Cl. ........................................ 124/20.3; 124/22
(58) Field of Classification Search .................... 124/17, 124/20.3, 21, 22
See application file for complete search history.

(56) References Cited

U.S. PATENT DOCUMENTS

| | | | |
|---|---|---|---|
| 1,866,926 A |   | 7/1932 | Colby |
| 3,509,863 A | * | 5/1970 | Barker ........................... 124/16 |
| 3,905,350 A | * | 9/1975 | Becker ........................... 124/17 |
| 4,169,456 A |   | 10/1979 | Van House |
| 4,458,658 A | * | 7/1984 | Blair ............................. 124/20.1 |
| 5,029,850 A | * | 7/1991 | van Straaten ................. 482/125 |
| 5,243,955 A | * | 9/1993 | Farless ......................... 124/20.1 |
| 5,345,922 A | * | 9/1994 | Ott ................................ 124/20.1 |
| 5,931,145 A |   | 8/1999 | Oviedo-Reyes |
| 6,273,078 B1 | * | 8/2001 | Schwesinger ................... 124/16 |

FOREIGN PATENT DOCUMENTS

| | | |
|---|---|---|
| FR | 1554932 | 1/1969 |
| FR | 2795604 | 1/2001 |
| FR | 2798188 | 3/2001 |

* cited by examiner

*Primary Examiner* — John Ricci
(74) *Attorney, Agent, or Firm* — Greenblum & Bernstein, P.L.C.

(57) ABSTRACT

The invention relates to an underwater catapult in which the arrow is propelled along the length of the barrel. The inventive catapult comprises a system which can be used to launch a gun arrow with bungee cords along the length of the shaft. The system comprises fixed or moving pulleys which are disposed on each side at the head of the gun and fixed or adjustable anchoring points (lugs, recesses) which are open for loading under the gun and which serve as support points to the tension cords for the movement thereof. The aforementioned pulleys can be used to load the large-sectioned bungees which are linked to variable- and standard-length bungees under the catapult for loading and power utilities. The catapult can be used to store more energy and use the integral characteristics of the elastic rubber. In this way, underwater hunters can equip themselves with an arm which is very powerful, accurate and recoil free compared to those currently available.

19 Claims, 10 Drawing Sheets

For the abstract

For the abstract

1 – Serial mount for 2 rubber bands

Side view of end of stock

Top view of end of stock

Fig 5

2 – Parallel mount for 2 rubber bands

Side view of end of stock

Top view of end of stock

Fig 6

3 – Parallel serial mount for 3 rubber bands

Side view of end of stock

Top view of end of stock

Fig 7

Section line a-b assembly of the stock, pulley system, and mobile pulley frame with axles

Fig 8

Side view of end of modified stock with axle of pulley frame

Fig 9

Section line x-y of the mobile pulley frame

Fig 10

S – point of attachment of the bottom band

Side view of the slide

Perforation for the axle of the two pulleys

Perforation for bolts for joining the two half-slides through the slot in the stock

Fig 11

Section line XY of the two half slides

Stock

Pulley with ring

Flat washers

Axle with set screws : mounted moderately tightly onto the slide

Fig 12

End of stock with slot for slide

Rubber shock absorber inserted

L (varies depending on kinematics)

Fig 13

Section line ZT

UNDERWATER CATAPULT IN WHICH THE ARROW IS PROPELLED ALONG THE LENGTH OF THE BARREL

BACKGROUND OF THE INVENTION

1. Field of the Invention

This invention relates to underwater guns (spear guns) and in particular, to rubber-powered (elastic) spear guns.

2. Description of Related Art

In the rubber-powered spear guns on the market, the rubber bands are located in the openings at the head of the barrel or on female threads.

The rubbers are stretched along the shaft using arm strength. (Only guns that are loaded by muscular force are allowed on the French territory.) Given the length of the rubber bands and their anchor points at the barrel head, the shaft is propelled only along two thirds of the barrel, the other third being reserved for the initial length of the elastomer rubber bands, and these spear guns have a recoil that is proportional to the number of rubber bands loaded.

SUMMARY OF THE INVENTION

The invention proposes to propel the shaft along the entire length of the barrel, and the rubber bands to remain under tension at the end of the gun after having released the shaft; which makes this rubber-powered spear gun even more competitive against compressed gas guns that also allow the propulsion of a shaft all the way to the end of the barrel.

By placing a system at the end of the gun (bars, pulleys, axles, rollers, sheaves, bearings, wheels) that allows the rubbers to pass from the top to the underside of the gun stock, and by loading rubber bands onto the shaft that are complemented by other rubber bands loaded onto the underside of the barrel at various anchor points, propulsion along the entire length of the stock is achieved. Compared to a conventional gun of equal length, one notes that propelling a shaft with a similar length, diameter, and number of rubber bands of the same type, a shaft propelled along the entire length of the barrel goes faster, farther, and with no recoil, compared to a shaft propelled along two thirds of the barrel. By loading elastic rubber bands of larger cross-section (20, 24, 28 millimeters or more) onto the shaft, the hunter who wants still more power can add even more (16 mm) rubber bands underneath the gun, since the shaft does not interfere with bottom loading.

With this method, fish can be shot at from farther away, and is pierced through more easily (power), the shaft is guided and propelled for a longer length of time (accuracy), and the recoil is divided by approximately ten (easier firing).

DETAILED DESCRIPTION OF THE INVENTION

The spear gun, as illustrated in FIGS. 1-4, is carved out of solid wood (biling a, doussie, Gabon wood) from the block. Its length varies from 1 to 1.7 meters, with a thickness ranging from four to five centimeters; the diameter of the shaft (4) ranging from six to ten millimeters, with lengths from 1.2 to 2 meters (any dimensions given or materials used in the description being nonlimiting). The shaft-locking mechanism is inserted into the butt, and the axles that secure the mechanism inside the butt also serve as trigger swivel and trigger bar.

The shaft (4) is catapulted along the entire length of the gun by the rubber bands (I, II). The wire (a) connecting the rubber bands that propels the shaft (4) ends its stroke one centimeter away from the end of the barrel against the stock, and the rubber bands are still tensioned at the end of the stroke. The wire (a) ends up abutted against the top part of the stock, otherwise the shaft (4) would be destabilized if the wire (a) of the rubber bands (I, II) touched the heel of the shaft (4) while passing to the underside.

At the head of the barrel is a system that facilitates the passage and the tension of the rubber bands (I, II) from the top to the underside of the gun. This system can consist of axles, bars, pulleys, rollers, bearings, wheels, and/or sheaves. It is attached of screws, threaded bolts, axles, tubes, washers, and/or nuts.

For practical purposes, a rubber band of very large cross-section (I) is loaded onto the shaft (4), passed through the pulleys (A) and joined on the underside to multiple rubber bands (II) (one, two, three or more) with a diameter smaller than the rubber bands at the top and of various lengths to allow for better elastic recovery, ease of loading, and power.

Figure 5:
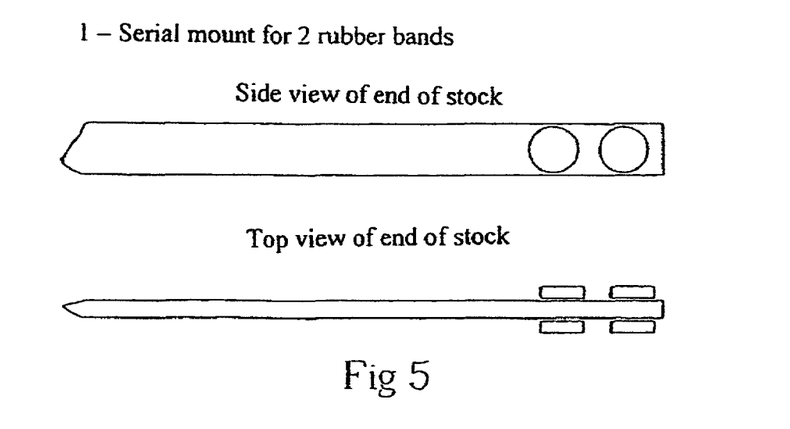
FIG. 5 is a side and top view of a serial mount of the pulleys, according to one aspect of the present invention.
Figure 6:
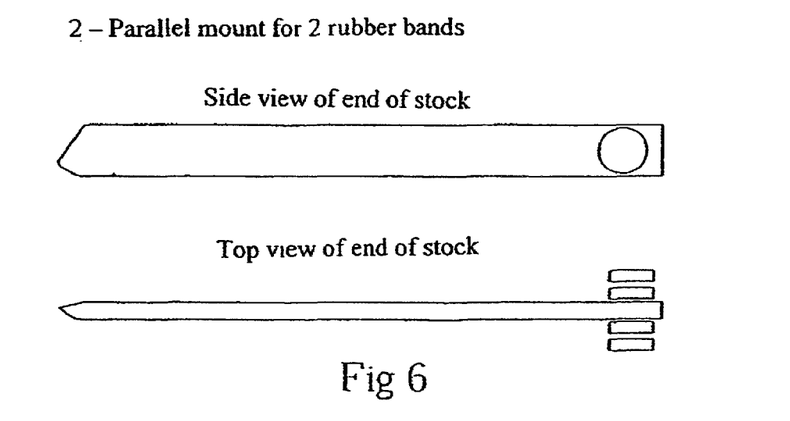
FIG. 6 is a side and top view of a parallel mount of the pulleys, according to one aspect of the present invention.
Figure 7:
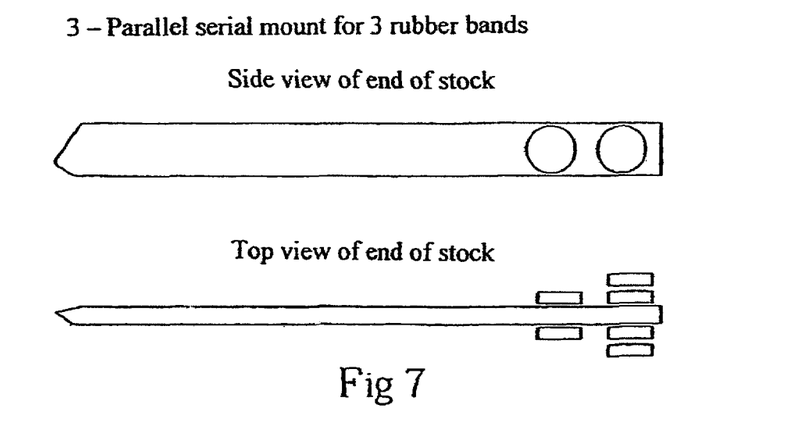
FIG. 7 is a side and top view of a serial-parallel mount of the pulleys, according to one aspect of the present invention.

The system for attaching the rubber bands (I, II) to the stock (B-D) can come in various forms depending on whether it is the wire (a) that joins the rubber bands (I, II) or their bodies that are anchored. Catches, which are either fixed or adjustable (mounted on a rail), or large notches, serve as bearing points. For the propelling band (I), the lower end of the stock can serve as a direct bearing point (B); in this case, the barrel extends further past the pulleys. The underside rubber bands (II) can be joined to the rubber band (I) either by the rubber band body or by the wire (a). The pulleys at the barrel end can be mounted in series (FIG. 5), in parallel (FIG. 6), or in parallel series (FIG. 7) to increase the number of rubber bands. If the number of rubber bands on the shaft and underneath the stock is increased, thus supercharging the rubber bands, one will use catches as bearing points and the rubber bands will have a connecting wire (a) at each end.

Figure 8:
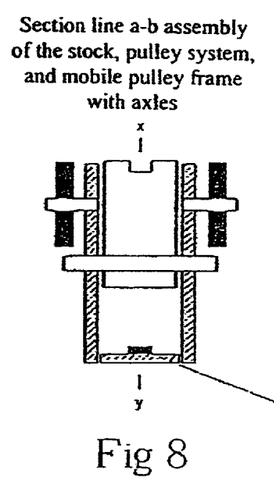
FIG. 8 is a side view of a rotationally mounted pulley, according to one aspect of the present invention.
Figure 9:
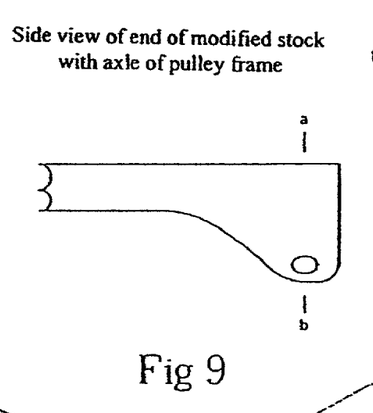
FIG. 9 is a sectional view of a rotationally mounted pulley, according to one aspect of the present invention.
Figure 10:
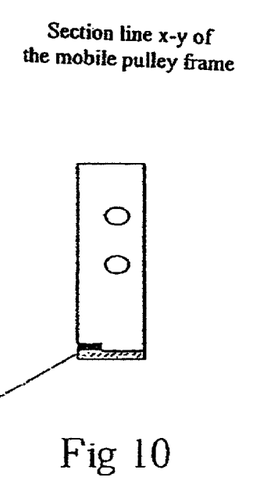
FIG. 10 is a top view of a rotationally mounted pulley, according to one aspect of the present invention.
Figures 11, 12:
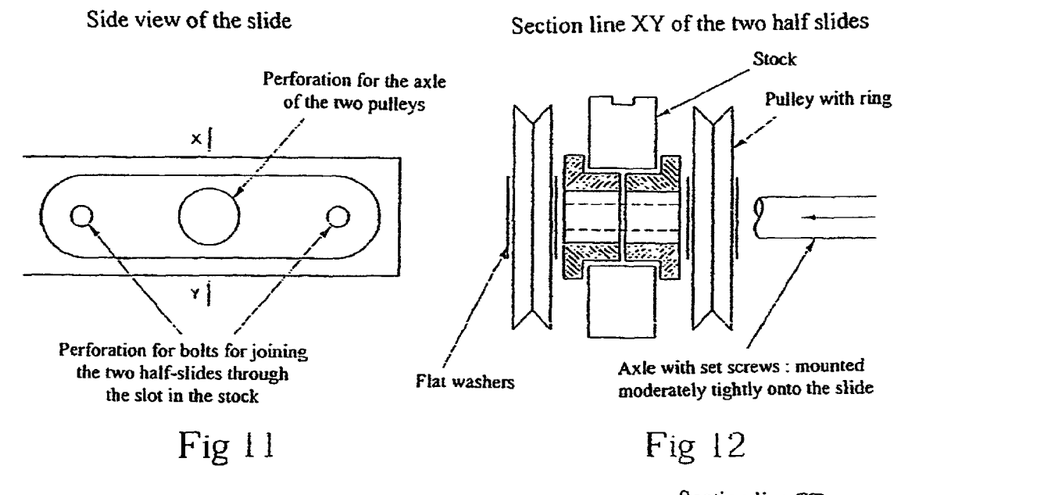
FIG. 11 is a side view of a translationally mounted pulley, according to one aspect of the present invention.
FIG. 12 is a sectional view of a translationally mounted pulley, according to one aspect of the present invention.
Figures 13, 14:
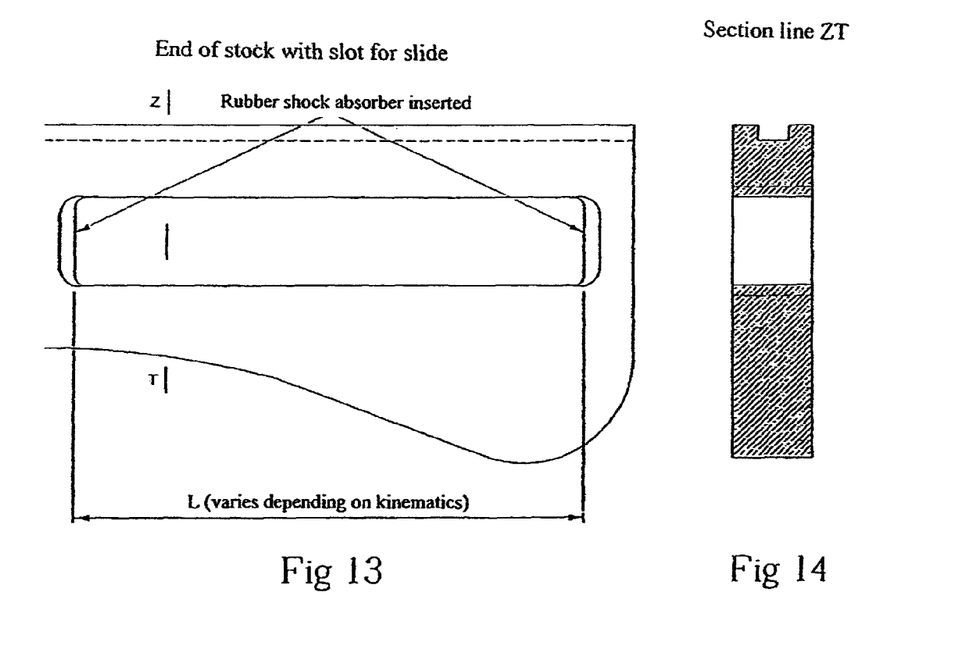
FIG. 13 is a side view of a slot for a translationally mounted pulley, according to one aspect of the present invention.
FIG. 14 is a sectional view of a slot for a translationally mounted pulley, according to one aspect of the present invention.
Figures 15, 16:
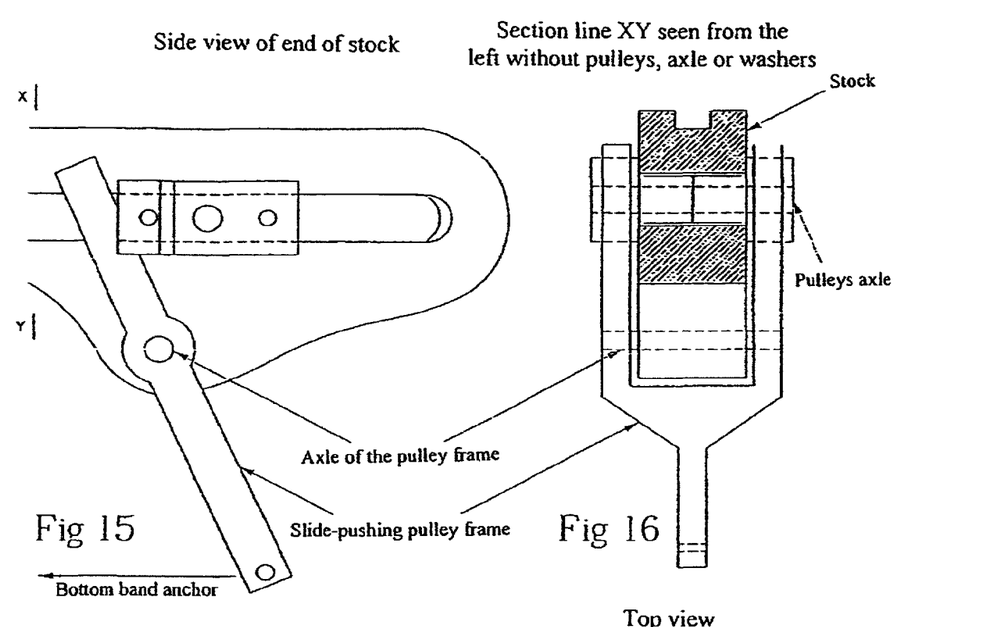
FIG. 15 is a side view of a translationally mounted pulley, according to one aspect of the present invention.
FIG. 16 is a sectional view of a translationally mounted pulley, according to one aspect of the present invention.
Figure 17:
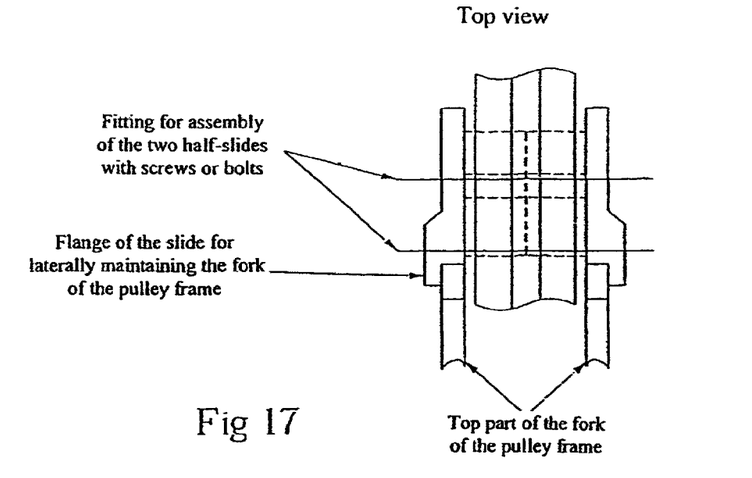
FIG. 17 is a top view of a translationally mounted pulley, according to one aspect of the present invention.
Figures 18, 19:
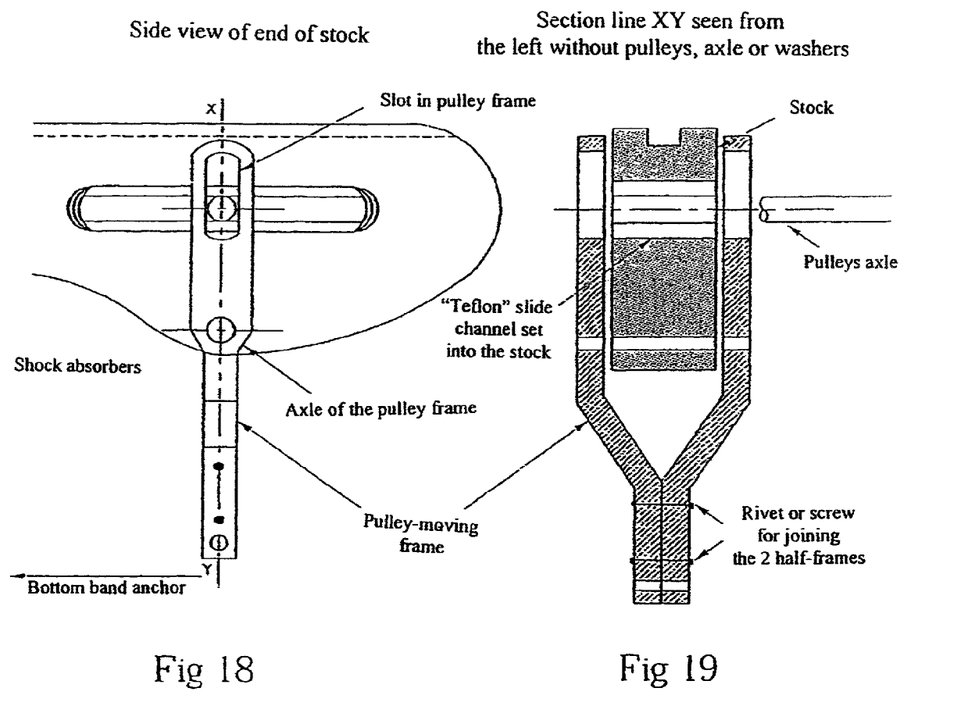
FIG. 18 is a side view of a translationally mounted pulley, according to one aspect of the present invention.
FIG. 19 is a sectional view of a translationally mounted pulley, according to one aspect of the present invention.
Figure 20:
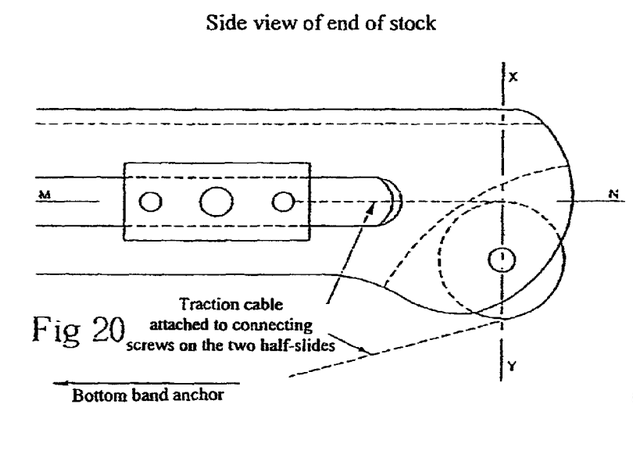
FIG. 20 is a side view of a translationally mounted pulley, according to one aspect of the present invention.
Figure 21:
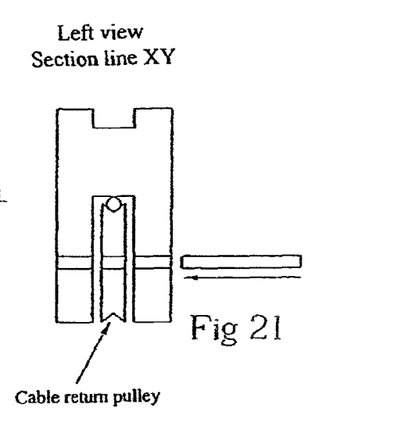
FIG. 21 is a sectional view of a translationally mounted pulley, according to one aspect of the present invention.
Figure 22:
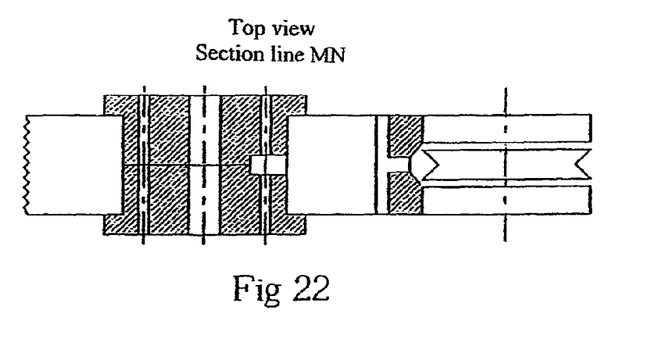
FIG. 22 is a top view of a translationally mounted pulley, according to one aspect of the present invention.

This system is shown fixed, but it can also be mobile. The pulleys in that case are mounted on a lever arm pulled down by means of rubber bands.
When the pulleys are mobile, the general movement can be rotational (FIGS. 8-10), or translational (FIGS. 15-22) when the lever arm pivoting on a bearing point pushes the axle connecting the pulleys in a displacement groove.

The greater ratio of the power gain to the system's over-all dimension and to the weight in the water will be of interest to a target shooter or a hunter with a short weapon.

The pulleys (A) have the same thickness as the rubber band (I), two centimeters, and the diameter depends on the width of the barrel. The wire (a) connecting the rubber bands has a cross-section of five millimeters for the propelling bands and of three millimeters for the tensioning bands.

The pulleys can be faired to allow the released wire (a) to glide through the entire system without any risk of catching.

The top rubber bands (I) are called propelling bands and those underneath are called tensioning bands (II); there is always more tension loaded on the underside, and therefore more tensioning bands to prevent the propelling bands (I) from stripping. The propelling bands (I) will have a cross-section greater than or equal to the tensioning bands (II). To ensure greater power, the tensioning band (II) loaded last will be as short as possible in order to have maximum tension in the end-barrel propulsion.

The recoil of the gun being greatly subdued with this system; this technology can be transferred to a land weapon.

Several questions arise as to the lack of recoil, the force generated and transmitted to the shaft, and the accuracy.

Why is there no recoil? To answer this question and all those that follow, it is necessary to refer to conventional spear guns and ask the question: Why do they have recoil? This recoil is directly proportional to the number of tensed rubber bands. The obvious physical answer is: action equals reaction. But experience shows that the greatest recoil sustained by your hand is due to the whiplash of the rubber bands in the water, since the rubber bands are not held firm and thus release part of their energy into the water. Conventional underwater guns become uncontrollable when five or more rubber bands are loaded; considering that 60 kilos of force is exerted on each tensed rubber band, that would make a total of 300 kilos. The invention makes it possible to store even more force without having the recoil generated by lashing through the water, since the propelling bands (I) held by the tensioning bands (II) prevent this whiplash. The recoil inherent to the fired shaft is absorbed by the tensioning bands (II), and their bearing points are oriented so as to transmit a forward thrust. This recoil becomes negligible where it was once intolerable; that is an experimental finding.

Why is this gun so powerful? Clearly the gun delivers only the energy stored during loading. Since you are freed from the problem of recoil, you can stretch a larger number of rubber bands; the invention makes it possible to load from the top, the bottom, and the shaft (4) is pulled all the way to the end of the barrel. Another advantage is that of being able to load propelling bands (I) of large cross section (20, 22, 24 millimeters or more), which cannot be used in conventional spear guns since you are not strong enough to stretch them to their elastic limit, onto the shaft; whereas with the proposed invention, by retracting them with (16 millimeter) rubber bands (II) stretched to their elastic limits, you achieve unequalled available power.

Why is it accurate? The shaft (4) is linearly guided in a groove all the way to the end of the stock, and the head of the catapult, due to its width, its pulleys, and its fairing, contributes to the stability of the gun. In conventional guns, there is a correlation between the power and the diameter of the propelled shaft; if too much force is exerted on an inappropriate cross-section, the shaft loses its stability since it is fired explosively along two thirds of the barrel; moreover the rubber bands are offset with respect to the axis of the stroke. These defects are corrected by adding sheaves, in which case the rubber bands pull along the axis of the shaft and the forces are better transmitted to the shaft along the entire length of the barrel. The workload is better distributed, making it possible to expand the limits imposed by conventional propulsion.

It is possible to distinguish between two types of shooting: in open water, where maximum power is required, and in a hole, where too much force will damage the tip against the rock after it has passed through the fish. By passing the propelling (I) and tensioning (II) bands through an element that slides along a rail fixed underneath the gun, by means of a knob that blocks the return of the tensioning rubber bands (II), a multi-use weapon, the power of which can be quickly adjusted, is achieved.

SPECIFICATION SHEET

Side view of the gun (unloaded 1/10 and loaded 4/10)
A: Pulleys at the head of a gun with its axle at the center and the loop of the shaft line on the nut, which serves as a line retainer.
B: Stop for the power rubber bands on the head of the gun. (For loading I onto C)
C: Tab of the shaft onto which the top rubber bands (I) are loaded.
D: Anchor point for the loading of the bottom rubber bands (II).
E: Double-handled butt.
I: Top (power) rubber bands to be loaded onto C (the tab of the shaft).
II: Bottom (tension) rubber bands to be loaded onto D (the number of rubber bands to be loaded underneath the stock depends on the cross-section of the power band).
The invention directly concerns points A, B, D and (3/10, FIG. 3):
1: Trigger.
2: Line release hook.
3: Slide.
4: Shaft.
5: Barb.
6: Wire.
7: Tunnel for the passage of the rubber bands (a simple wire prevents the stretched rubber bands from coming off, once the gun is fired). Cutaway view of the head of the gun (2/10):
8: Groove for guiding the shaft.
9. Axle connecting the pulleys and serving as the bearing point in the head of the gun.

Figure 1:
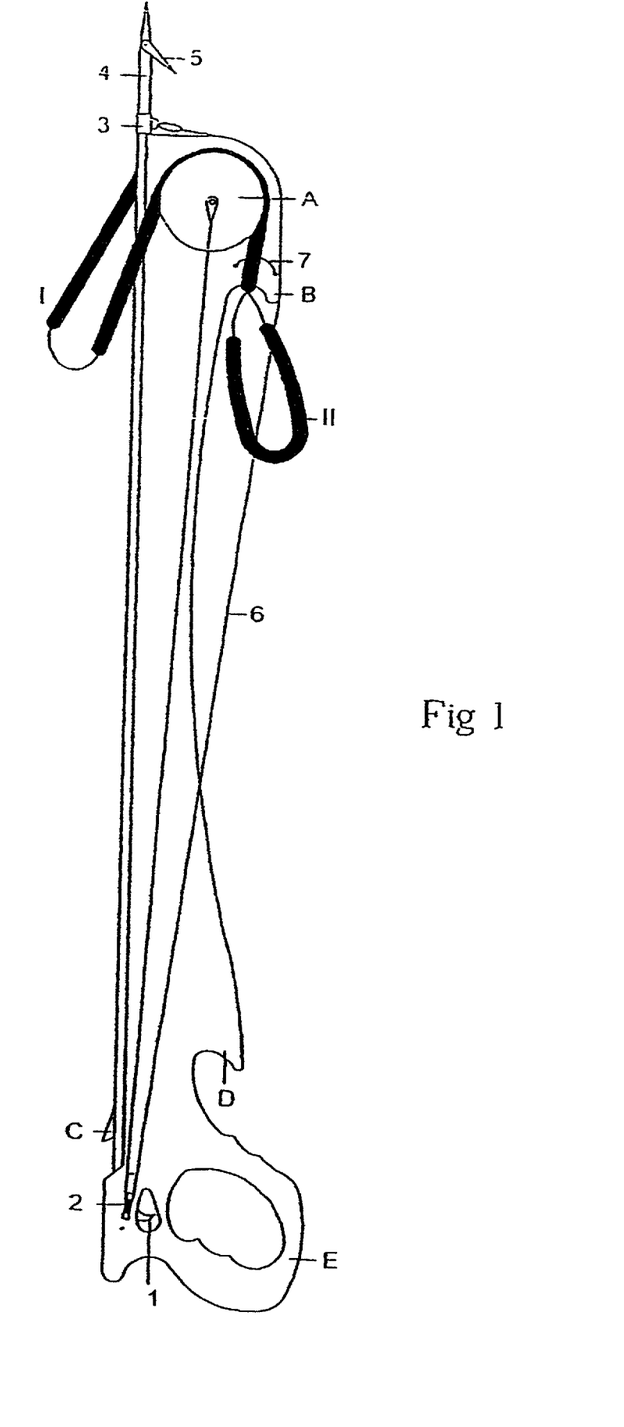
FIG. 1 is a side view of a spear gun shown in a loaded configuration, according to the present invention.
Figure 2:
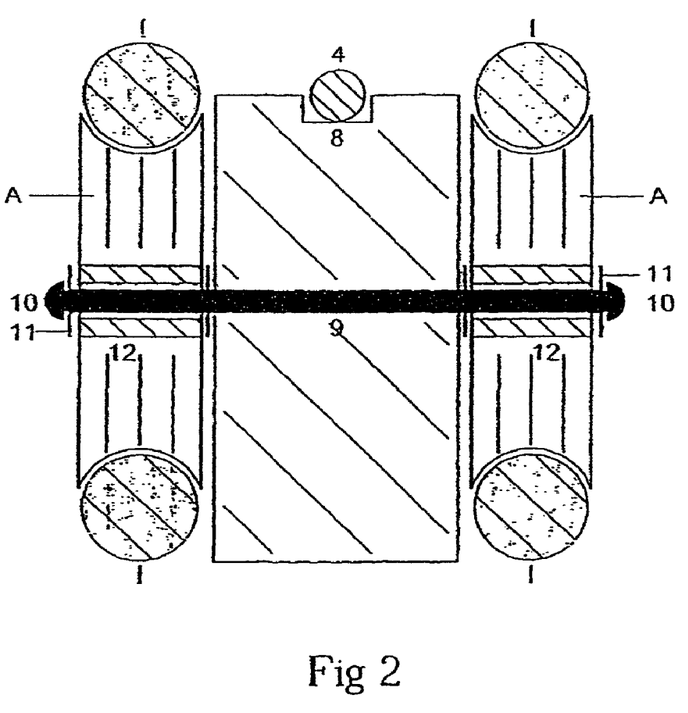
FIG. 2 is sectional view of a spear gun.

10: Nuts.
11: Washers.
12: Tubes between the axle (9) and the pulleys (A), (a tube can also pass through the head of the gun; it is also possible to use a bearing in place of 12).

Figure 3:
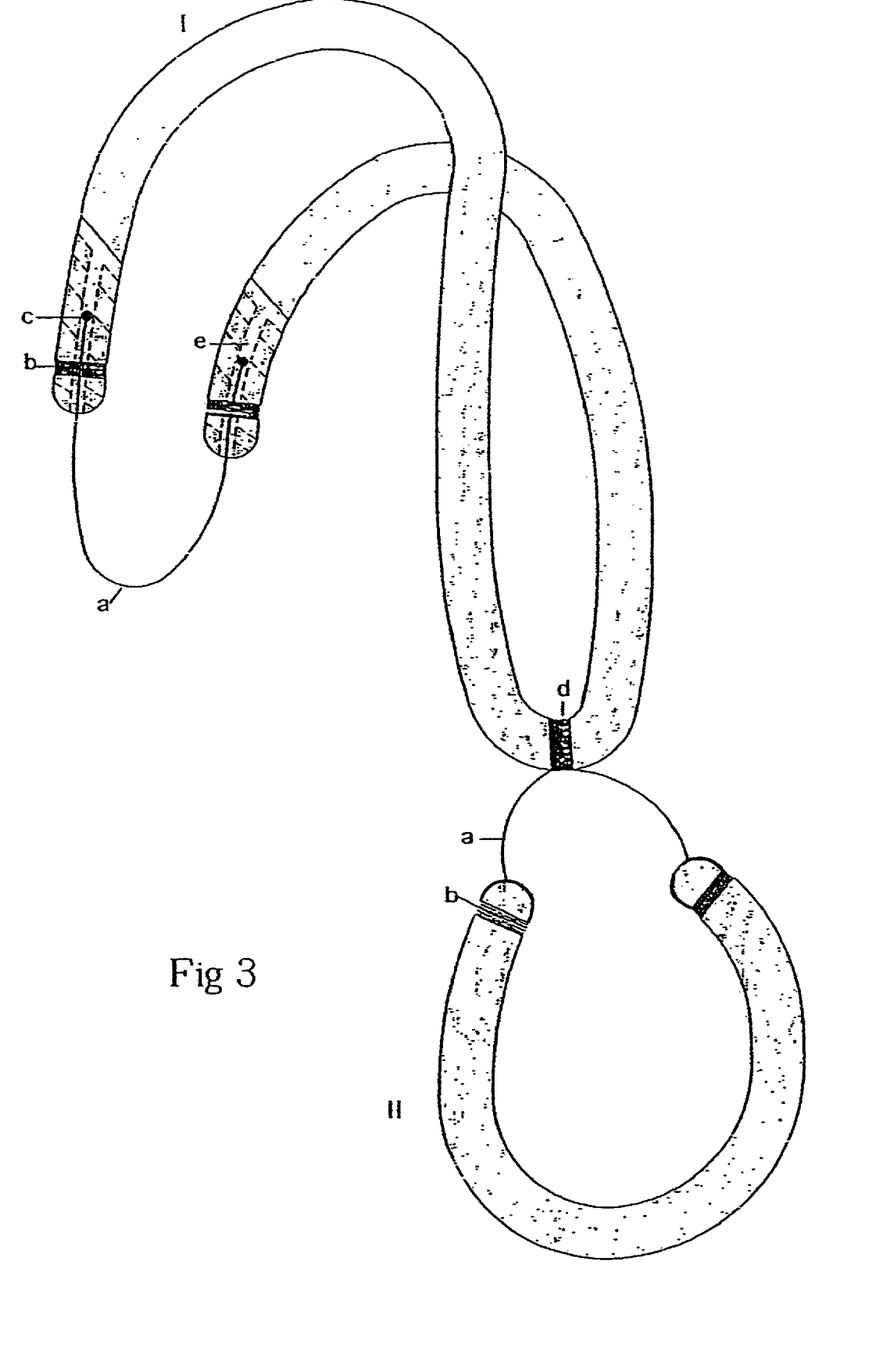
FIG. 3 is view of the joined rubber bands, according to one aspect of the present invention.
Figure 4:
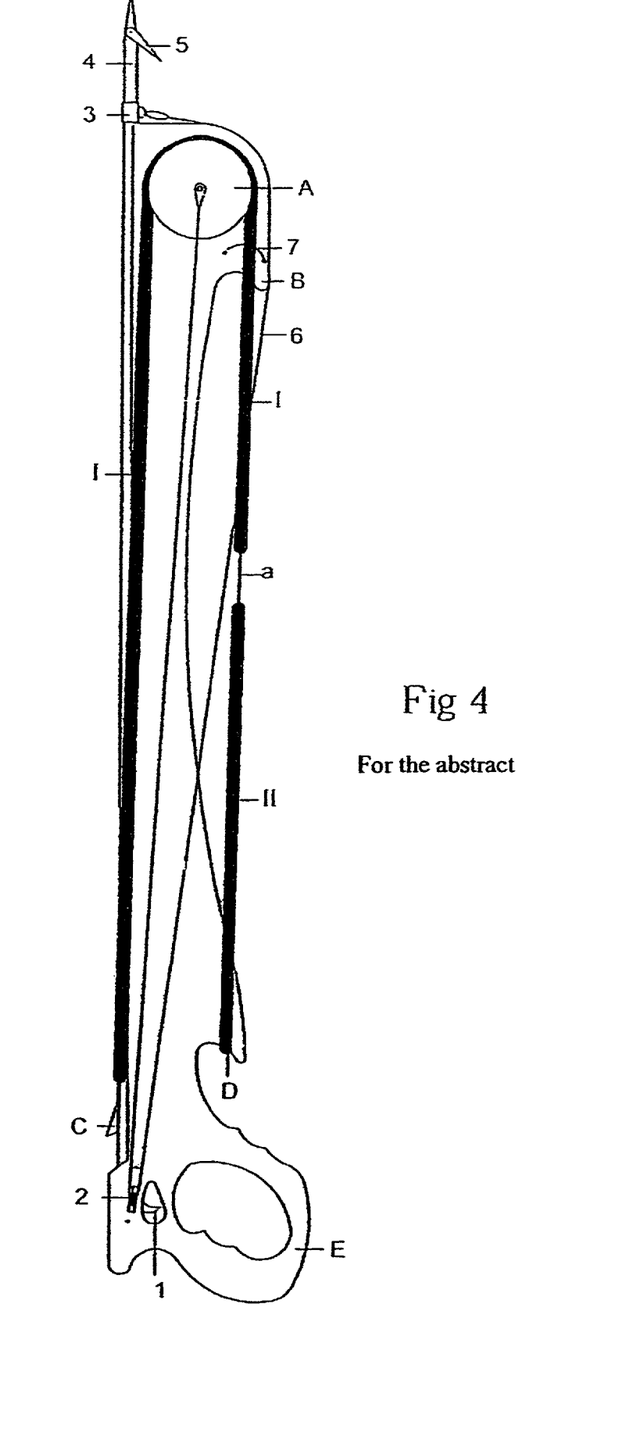
FIG. 4 is a side view of a spear gun shown in an unloaded configuration, according to the present invention.

Diagram of the joined rubber bands (3/10), FIG. 3, only one elastic band I and II is represented):

a. Wire connecting the two ends of a band (in order to hold up against the stop at the end of the gun, this wire should have a cross-section of about five millimeters for power rubber bands and three millimeters for tension rubber bands).
b. Added binding preventing the wire from coming out of the band.
c. Knot wedging the wire against the binding.
d: Connection through use of a fitting, a binding with cord, or a strap joining the (power) rubber bands I and (tension) rubber bands II.
e: Channel through the center of the band For a clearer understanding of the drawings, only one tension band and one power band are represented. For the same section, a power band could be joined to two tension rubber bands.

The invention claimed is:

1. A spear gun for propelling a shaft comprising:
   a barrel extending to a head;
   propelling rubber bands and tensioning rubber bands; and
   pulleys, located at the head, arranged to guide the propelling rubber bands to pass from a top of the barrel to an underside of the barrel, wherein the shaft is propelled along an entire length of the barrel.

2. The spear gun according to claim 1, wherein the pulleys are mounted in series.

3. The spear gun according to claim 1, wherein the pulleys are mounted in parallel.

4. The spear gun according to claim 1, wherein the pulleys are mounted in parallel series.

5. The spear gun according to claim 1, wherein the pulleys are faired to allow a released wire to glide through the spear gun.

6. The spear gun according to claim 1, wherein the pulleys comprise:
   a set of mobile pulleys, wherein an additional rubber band loaded on the underside actuates the pulleys by actuation of a lever arm.

7. The spear gun according to claim 6, wherein the pulleys slide inside a slot and can be pushed or pulled.

8. The spear gun according to claim 6, further comprising: a slide-pushing control.

9. The spear gun according to claim 6, further comprising: a sliding pulley-frame control.

10. The spear gun according to claim 6, further comprising: a slide-pulling control.

11. The spear gun according to claim 1, wherein the propelling rubber bands are one of joined by a fitting and tied to the tensioning rubber bands, and wherein a number of rubber bands and respective cross-sections of the number of rubber bands depend on the strength of an individual user and on a power desired for propelling a shaft of a given caliber.

12. The spear gun according to claim 11, wherein two tensioning rubber bands are loaded for one propelling rubber band.

13. The spear gun according to claim 11, wherein a cross-sectional ratio between the propelling rubber bands and the tensioning rubber bands is utilized to provide at least one of better elastic recovery, ease of loading, and power.

14. The spear gun according to claim 1, wherein the rubber bands can be stopped during their stroke in order to reduce the power.

15. The spear gun according to claim 1, being structured and arranged as a underwater spear gun.

16. The spear gun according to claim 1, further comprising connecting wires, wherein the propelling rubber bands and the tensioning rubber bands are each divided in a middle into separate branches joined to one another by the connecting wires.

17. The spear gun according to claim 1, wherein the pulleys' axes are one of fixed and mobile.

18. A method of using a spear gun, comprising:
    loading a shaft onto a top of a spear gun barrel;
    loading at least one propelling rubber band, guided from an underside of the barrel to a top of the barrel, onto the shaft; and
    propelling the shaft along an entire length of the barrel.

19. The method of claim 18, further comprising:
    tensioning the at least one propelling rubber band with at least one tensioning rubber band arranged on an underside of the barrel,
    whereby, after a releasing of the shaft from the barrel, the at least one propelling rubber band remains under at least some tension at an end of the barrel.

* * * * *